(12) United States Patent
King et al.

(10) Patent No.: US 8,205,161 B2
(45) Date of Patent: Jun. 19, 2012

(54) GRAPHICAL PROGRAMMING SYSTEM WITH EVENT-HANDLING NODES

(75) Inventors: Jason King, Austin, TX (US); Craig Smith, Austin, TX (US); Greg McKaskle, Austin, TX (US); Andrew Dove, Austin, TX (US)

(73) Assignee: National Instruments Corporation, Austin, TX (US)

( * ) Notice: Subject to any disclaimer, the term of this patent is extended or adjusted under 35 U.S.C. 154(b) by 559 days.

(21) Appl. No.: 12/484,897

(22) Filed: Jun. 15, 2009

(65) Prior Publication Data

US 2009/0288025 A1 Nov. 19, 2009

Related U.S. Application Data

(63) Continuation of application No. 09/976,726, filed on Oct. 12, 2001, now Pat. No. 7,559,032.

(51) Int. Cl.
*G06F 3/048* (2006.01)
*G06F 9/44* (2006.01)
*G06F 17/50* (2006.01)

(52) U.S. Cl. ........ 715/763; 715/764; 717/104; 717/100; 716/100; 703/13

(58) Field of Classification Search .................. 715/763, 715/764; 717/104, 100; 716/100; 703/13
See application file for complete search history.

(56) References Cited

U.S. PATENT DOCUMENTS

| | | | |
|---|---|---|---|
| 5,301,336 A | 4/1994 | Kodosky et al. | |
| 5,651,108 A | 7/1997 | Cain et al. | |
| 5,760,788 A | 6/1998 | Chainini et al. | |
| 6,173,438 B1 | 1/2001 | Kodosky et al. | |
| 6,219,628 B1 | 4/2001 | Kodosky et al. | |
| 6,327,594 B1 | 12/2001 | Van Huben et al. | |
| 6,366,300 B1 | 4/2002 | Ohara et al. | |
| 6,425,120 B1 | 7/2002 | Morganelli et al. | |
| 6,425,121 B1 | 7/2002 | Phillips | |
| 6,578,174 B2 | 6/2003 | Zizzo | |

(Continued)

OTHER PUBLICATIONS

"Simulink Using Simulink, Version 4," Nov. 2000, Front Page, Table of Contents, pp. 3-14-3-18, 5-26-5-29, 8-1-8-13, 9-261-9-262.
"Stateflow User's Guide, Version 4," Oct. 2001, Front Page, Table of Contents, Chapters 1-5.

(Continued)

*Primary Examiner* — Ting Lee

(74) *Attorney, Agent, or Firm* — Meyertons Hood Kivlin Kowert & Goetzel, P.C.; Jeffrey C. Hood; Jason L. Burgess

(57) ABSTRACT

A system and method for enabling a graphical program to receive and respond to programmatic events, such as user interface events. The graphical program may include a graphical user interface having various user interface elements and a block diagram having a plurality of nodes indicating functionality of the graphical program. The graphical program may be configured to receive and respond to one or more user interface events. For each event, a portion of graphical source code (such as a plurality of interconnected nodes) may be included in the block diagram, wherein the portion of graphical source code is operable to receive and respond to the respective user interface event. The portion of graphical source code may be executable to perform a desired process or action in response to the respective event. In one embodiment, a sub-program node may be associated with each event. In another embodiment, an event structure node may be included in the block diagram, wherein the event structure node includes one or more sub-diagrams, each sub-diagram including graphical source code for responding to one or more events.

20 Claims, 11 Drawing Sheets

U.S. PATENT DOCUMENTS 6,684,385 B1 1/2004 Bailey et al.
6,701,513 B1 3/2004 Bailey
2002/0156757 A1 10/2002 Brown

OTHER PUBLICATIONS

Cox, Philip T. and Tomasz Pietrzykowski, "Visual Message Flow Language MFL and Its Interface," Advanced Visual Interfaces, 1992, pp. 348-361.

GRAPHICAL PROGRAMMING SYSTEM WITH EVENT-HANDLING NODES

PRIORITY CLAIM

This application is a continuation of Ser. No. 09/976,726 titled "System and Method for Enabling a Graphical Program to Respond to User Interface Events" and filed Oct. 12, 2001, now U.S Pat. No. 7,559,032 whose inventors are Jason King, Craig Smith, Greg McKaskle and Andrew Dove and which is hereby incorporated by reference in its entirety as though fully and completely set forth herein.

FIELD OF THE INVENTION

The present invention relates to the field of graphical programming, and more particularly to a system and method for enabling a graphical program to receive and respond to programmatic events, such as user interface events.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

In parallel with the development of the graphical programming model, a programming model referred to as "event-driven programming" has become increasingly common in recent years. Many early programs operated in a pre-determined, sequential fashion. For example, before the rise of event-driven programming, a typical program would perform a pre-determined sequence of actions, such as: perform some processing, display the results, wait for a user response, perform more processing, etc. However, as applications became more sophisticated and new window-based user interface systems were developed, the event-driven programming model was adopted. In event-driven programming, the program code is written so that the program can respond to various types of external events as they occur. The program itself has little or no control over the sequence and choice of events generated, but simply responds by carrying out the appropriate actions in response to the generated events.

Many types of events are referred to herein as "user interface events". These events are typically initiated by a person interacting with the graphical user interface of a program. User interface events are generated as natural products of the normal operation of window-based user interface systems such as those provided by the Macintosh Operating System, Microsoft Windows, the X Window System, and the Java Abstract Window Toolkit. Such user interface events indicate user behavior with respect to the user interface elements that make up an application's graphical user interface (e.g., mouse movements with respect to application windows, keyboard presses with respect to application input fields, mouse clicks with respect to application buttons, menus, and lists).

For example, consider a program with a graphical user interface that includes a button user interface element. When a user pushes the button during operation of the program, a "button push" event may be generated in response. If a portion of the program has been associated with button push events for that button, then that portion of the program would take control in response to the generated button push event and respond in some way. Different programming environments utilize different techniques for associating a portion of a program with an event. For example, many text-based programming environments enable event handler procedures or callback routines to be registered for various events.

In addition to events being generated in response to user actions, events may also be generated by program instructions of the program itself. For example, a programmmer may write a program operable to explicitly generate certain user interface events, e.g., to "artificially" interact with the graphical user interface, e.g., for simulation purposes. Also, other types of events are possible in addition to user interface events. Examples of other types of events include: system events; events generated in response to data acquired from a device; events generated during playback of digital audio or video; timer events, etc. All of these various types of events can provide the program with information about what is occurring externally to the program.

User interface events can provide a program with a great level of detailed information on a user's actions. For example, consider the seemingly simple "button push" event described above. Numerous low-level events may actually be generated during the course of pushing the button, e.g., depending on the state of the user interface before the button is clicked and/or depending on how exactly the user clicks the button. For example, clicking on the button with a mouse, tabbing to the button using the keyboard and hitting the return key, or even using speech recognition and speaking the button's label can all be said to amount to the same thing; namely, "pushing" the button. If the user pushes the button, for example, by tabbing to the button and hitting the return key, then various low-level events may be generated in response, e.g., a "get keyboard focus" event when the user tabs to the button, a "key down" event when the user presses the return key, a "key up" event when the user releases the return key, etc. The "button push" event described above may also be generated when the user releases the return key.

Of course, the exact sequence of the events that are generated, the names of these events, and the timing of the event generation may vary, e.g., depending on the particular platform or programming environment, but this example illustrates the concepts involved. If the programmer is interested in responding to the relatively "low-level" events, such as the "get keyboard focus" event, he may enable the program to receive and respond to this event. If, on the other hand, only the "higher-level" "button push" event is of interest, the program does not need to include any code to respond to the lower-level events. In other words, the event-driven programming model can provide the programmer with a high degree of flexibility and control in responding to the user's actions.

However, while developers of text-based programs have benefited from this type of flexibility and control in receiving and responding to events, developers of graphical programs have not had the same benefit. Thus, it is desirable to provide a system and method for enabling a graphical program to receive and respond to programmatic events, such as user interface events.

SUMMARY OF THE INVENTION

One embodiment of the present invention comprises a system and method for enabling a graphical program to receive and respond to programmatic events, such as user interface events. The graphical program may include a graphical user interface having various user interface elements such as one or more windows or panels, menu bars, context menus, etc., as well as various user interface controls and indicators for receiving program input and/or displaying program output. The graphical program may also include a block diagram. The block diagram may be created in response to direct user input, e.g., the user may create the block diagram by placing or "dragging and dropping" icons or nodes on the display and interconnecting the nodes in a desired fashion. The plurality of nodes in the block diagram may be interconnected to visually indicate functionality of the graphical program. The block diagram may have one or more of data flow, control flow, and/or execution flow representations.

The graphical program may be configured to receive and respond to one or more programmatic events, such as user interface events, system events, timer events, etc. For example, configuring the graphical program to receive one or more user interface events may comprise configuring the graphical program to receive notification when the one or more user interface events are generated during execution of the graphical program. Thus, the graphical program may receive information specifying occurrences of the one or more user interface events during execution of the graphical program.

In one embodiment, configuring the graphical program to receive and respond to one or more user interface events may comprise configuring the block diagram of the graphical program to receive and respond to the one or more user interface events. For example, for each event, a portion of graphical source code (such as a plurality of interconnected nodes) may be included in the block diagram, wherein the portion of graphical source code is operable to receive and respond to the respective user interface event. The portion of graphical source code may be executable to perform a desired process or action in response to the respective event. Thus, responding to a user interface event may comprise executing a portion of graphical source code that has been associated with that event.

A portion of graphical source code may be associated with an event in any of various ways and may be related to other nodes in the block diagram in any of various ways. In one embodiment, a sub-program node may be associated with an event. A sub-program node may comprise a node that is included in the block diagram, wherein the node specifies or represents a separate block diagram. Thus, graphical source code to respond to the various events may be encapsulated "behind" or "within" respective sub-program nodes. In another embodiment, an event structure node may be included in the block diagram, wherein the event structure node includes one or more sub-diagrams, each sub-diagram including graphical source code for responding to one or more events. One embodiment of an event structure node is discussed in detail.

In one embodiment, the user may specify the desired events that the graphical program should receive and respond to by interacting with a graphical user interface dialog or wizard. For example, the dialog may display a list of user interface elements and event actions associated with those elements, allowing the user to select the elements and actions of interest. In response to the user's selections, a graphical source code "placeholder" portion may be automatically included in the block diagram and associated with each selected event, e.g., a sub-program node or a sub-diagram of an event structure node may be created for and associated with each selected event. The user may then specify graphical source code for the placeholder portions, e.g., by including a plurality of interconnected nodes in each sub-program or sub-diagram, such that the graphical source code is operable to respond to the respective event in the desired manner. In some cases, the user may want the same portion of graphical source code to respond to multiple events. Thus, the dialog may enable the user to group events together as desired. For example, a single sub-diagram of an event structure node may be associated with two or more events.

When using a dialog such as described above, the specified events may be registered such that upon execution startup, the graphical program begins receiving and responding to the specified events. However, in some cases it may be desirable to dynamically register an event during execution of the graphical program. For example, for a given event, it may only be necessary or desirable to receive and respond to the event if some condition becomes true during the course of executing the program. Thus, the event may be dynamically registered when the condition becomes true or at some predetermined point in the program. In one embodiment, an event registration node may be included in the block diagram and may be configured to register an event. The event registration node may be executable to dynamically register the event such that, after registering the event, the graphical program is operable to receive and respond to the event.

Similarly, it may also be desirable to un-register an event at some point during execution of the graphical program. The event to be un-registered may be an event that was specified at edit time via a dialog as described above or may be an event that was previously registered dynamically. In one embodiment, an event un-registration node may be included in the block diagram and may be configured to un-register an event. The event un-registration node may be executable to dynamically un-register the event such that, after un-registering the event, the graphical program does not receive and respond to the event.

Although the method is described above in terms of user interface events, the method may also be used to create a graphical program operable to receive and respond to any other type of programmatic event.

BRIEF DESCRIPTION OF THE DRAWINGS

A better understanding of the present invention can be obtained when the following detailed description of the preferred embodiment is considered in conjunction with the following drawings, in which.

Figure 1:
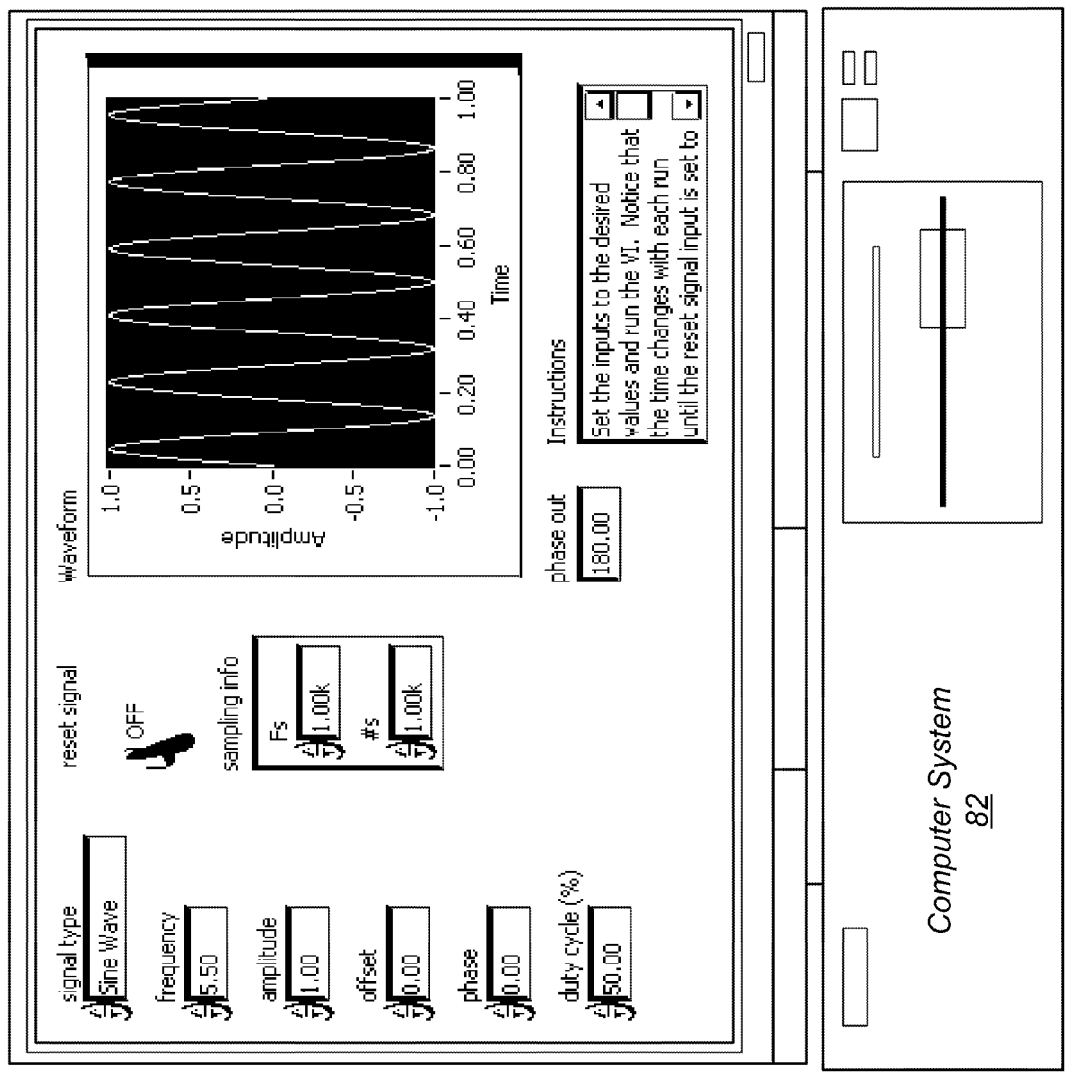
FIG. 1 illustrates a computer system operable to execute a graphical program configured to receive and respond to user interface events.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/565,610 titled "System and Method for Encapsulating User Interface Code for a Graphical Program," filed May 4, 2000.

U.S. patent application Ser. No. 09/617,600 titled "Graphical Programming System with Distributed Block Diagram Execution and Front Panel Display," filed Jun. 13, 2000.

U.S. patent application Ser. No. 09/745,023 titled "System and Method for Programmatically Generating a Graphical Program in Response to Program Information," filed Dec. 20, 2000.

The present application is directed to a system and method for creating and/or executing a graphical program configured to receive and respond to programmatic events, such as user interface events. A graphical program may comprise a block diagram, e.g., may comprise graphical source code. As used herein, the terms "graphical program" and "graphical source code" refer to a program and/or code including two or more interconnected nodes or icons that visually indicate the functionality of the program. The nodes may be connected in one or more of a data flow, control flow, and/or execution flow format. The nodes may also be connected in a "signal flow" format, which is a subset of data flow. One or more of the nodes may optionally be connected to one or more terminals or icons of various user interface element(s).

A graphical program may also comprise a user interface or front panel. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface of a graphical program may enable the user to interactively control or manipulate the input being provided to the graphical program.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, and VisSim from Visual Solutions, among others.

FIG. 1—Computer System

FIG. 1 illustrates a computer system 82 operable to execute a graphical program configured to receive and respond to programmatic events, such as user interface events. One embodiment of a method for creating a graphical program operable to receive and respond to programmatic events is described below. The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

As shown in FIG. 1, the computer system 82 may include a display device operable to display a graphical user interface or front panel of the graphical program during execution of the graphical program. The graphical user interface may comprise any type of graphical user interface, e.g., depending on the computing platform. In one embodiment the graphical user interface may comprise one or more windows, such as those used in window-based user interface systems such as provided by the Macintosh Operating System, Microsoft Windows, the X Window System, etc. The graphical user interface may include a plurality of user interface elements, including indicators for displaying output of the graphical program and/or controls for specifying program input to the graphical program. Examples of user interface controls and indicators include charts, graphs, push buttons, knobs, numeric controls, text boxes, check boxes, list boxes, etc. The graphical user interface may also include any of various other types of user interface elements, such as menu bars, popup context menus, window close buttons, etc.

As the user interacts with the graphical user interface, various types of user interface events may be generated, as described above, and the graphical program may receive and respond to these events. As described in more detail below, the graphical program may be configured to receive and respond to only those events of interest. As used herein, responding to an event may comprise executing a portion of the graphical program, e.g., a portion of graphical source code, in response to the event.

In receiving the event, the graphical program may receive information specifying the event. The details of the information received may depend on the particular event. In one embodiment, the information may specify a source for the event, such as a user interface element with which the event is associated or from which the event is generated. For example, where the event is generated in response to the user interacting with a user interface control, the information may specify that control. As another example, where the event is generated in response to the user clicking the close button of a window, the information may specify that window. The information may also specify an action or type for the event, such as "value changed", "get keyboard focus", "window resize", etc.

It is noted that the graphical program may be configured to receive and respond to any other type of programmatic event, in addition to user interface events. For example, in various embodiments the graphical program may be configured to receive and respond to system events, events generated in response to data acquired from a device, etc.

The computer system 82 may include a memory medium(s) on which one or more computer programs or software components according to one embodiment of the present invention may be stored. For example, the memory medium may store the graphical program itself. Also, the memory medium may store a graphical programming development environment application used to create and/or execute such a graphical program. For example, the graphical programming development environment may provide an execution environment operable to generate and/or send the programmatic events to the graphical program. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Figure 2:
FIG. 2 illustrates a system including a first computer system that displays the graphical user interface of a graphical program and a second computer system that executes the block diagram of the graphical program, wherein the graphical program is operable receive and respond to user interface events.

FIG. 2—Computer Network

FIG. 2 illustrates a system including a first computer system 82 that displays the graphical user interface of a graphical program and a second computer system 90 that executes the block diagram of the graphical program, wherein the graphical program is operable receive and respond to user interface events, similarly as described above. The computer system 82 may be connected through a network 84 to the second computer system 90. The computer systems 82 and 90 may each be any of various types, as desired. Also, the network 84 can also be any of various types, including a LAN (local area network), WAN (wide area network), the Internet, or an Intranet, among others.

Program output of the block diagram executing on the computer system 90 may be displayed in the graphical user interface on a display device of the computer system 82. Also, in response to receiving user input to the graphical user interface, the user input may be provided to the block diagram. The above-incorporated patent application titled "Graphical Programming System with Distributed Block Diagram Execution and Front Panel Display" describes one embodiment of a method enabling graphical program execution and GUI display of the graphical program output to be distributed across multiple computer systems.

In another embodiment, the graphical user interface of the graphical program may be displayed on a display device of the computer system 82, and the block diagram may execute on a reconfigurable instrument 190 connected to the computer system 82. The reconfigurable instrument 190 may include configurable logic, such as a programmable logic device (PLD), e.g., an FPGA, or a processor and memory, which may execute a real time operating system. In one embodiment, the graphical program may be downloaded and executed on the reconfigurable instrument 190. For example, an application development environment with which the graphical program is associated may provide support for downloading a graphical program for execution on configurable logic in a real time system.

Figure 3:
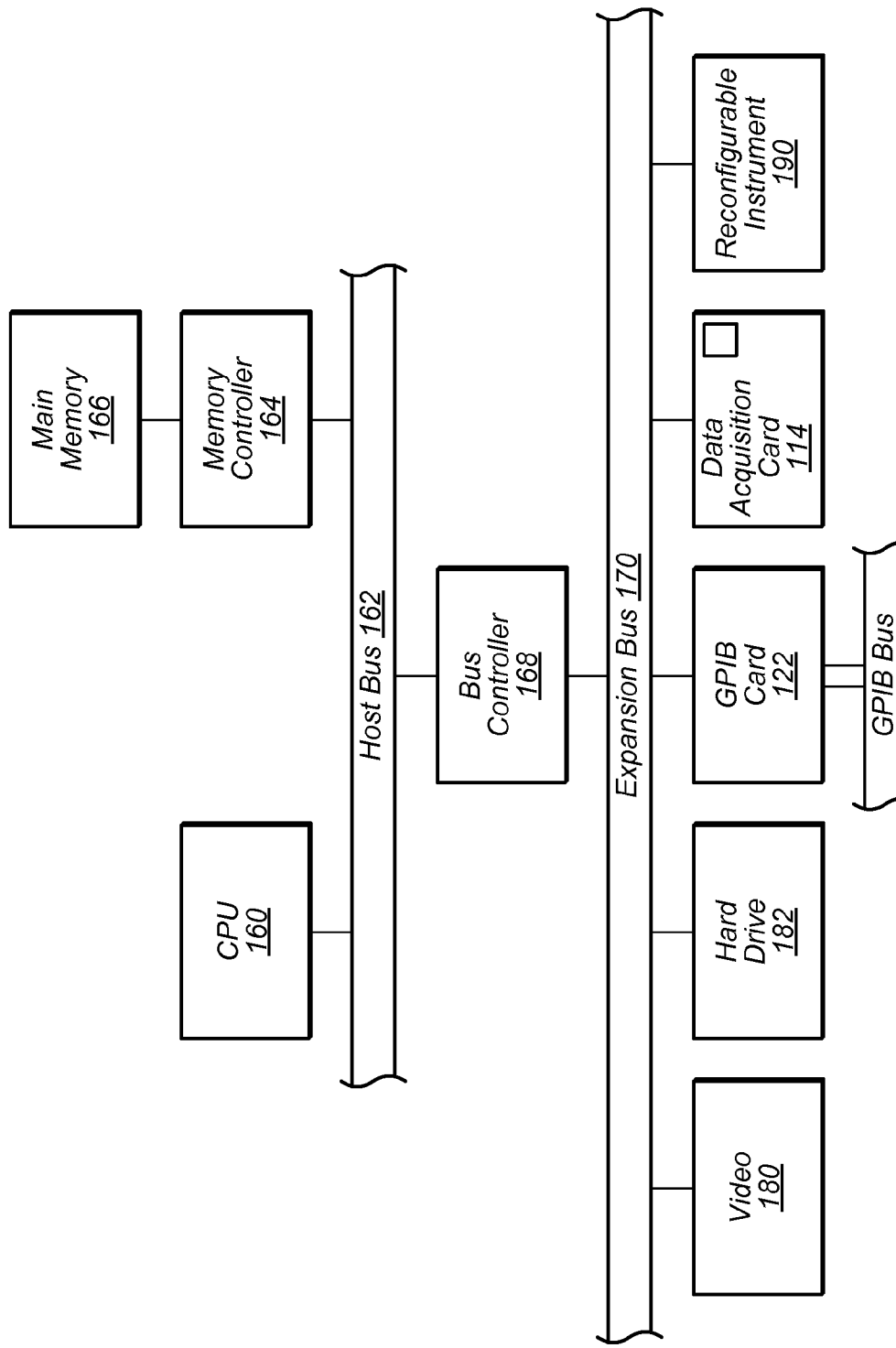
FIG. 3 is a block diagram of the computer systems of FIGS. 1 and 2.

FIG. 3—Computer System Block Diagram

FIG. 3 is a block diagram representing one embodiment of the computer system 82 and/or 90 illustrated in FIGS. 1 and 2. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer 82 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store the graphical program operable to receive and respond to programmatic events. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

As described above, a reconfigurable instrument 190 may also be connected to the computer 82. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114.

Figure 4:
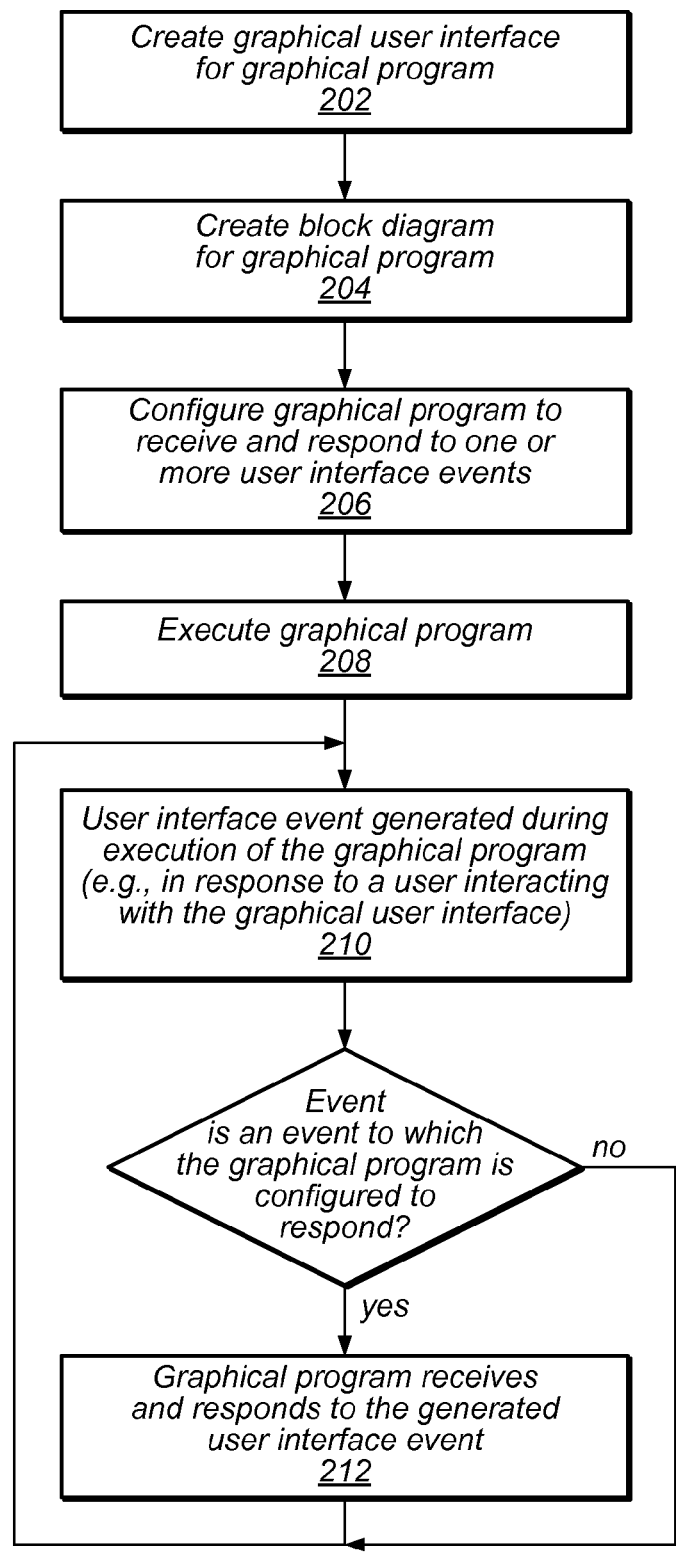
FIG. 4 is a flowchart diagram illustrating one embodiment of a method for creating a graphical program operable to receive and respond to user interface events.

FIG. 4—Creating the Graphical Program

FIG. 4 is a flowchart diagram illustrating one embodiment of a method for creating a graphical program operable to receive and respond to user interface events. It is noted that steps in the following flowcharts may occur concurrently or in different orders than that shown.

In step 202, a graphical user interface or front panel for the graphical program may be created, e.g., in response to user input. The graphical user interface may be created in any of various ways, e.g., depending on the graphical programming development environment used.

Creating the graphical user interface or front panel may comprise specifying various user interface elements. These user interface elements may include elements such as one or more windows or panels, menu bars, context menus, etc., as well as various user interface controls and indicators for receiving program input and/or displaying program output. Examples of user interface controls and indicators include charts, graphs, push buttons, knobs, numeric controls, text boxes, list boxes, check boxes, etc. For example, the LabVIEW graphical programming development environment, available from National Instruments Corporation, provides various user interface elements for inclusion in a graphical user interface. The kinds of user interface elements that are included in the graphical user interface may vary depending on the targeted platform of the graphical program. For example, if the graphical program is intended to execute on a personal digital assistant (PDA) or handheld computer, then the graphical user interface may include different types of elements than if the graphical program were intended to execute on a desktop computer system.

In step 204, a block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

In step 206, the graphical program may be configured to receive and respond to one or more user interface events, in response to user input. Step 206 may be performed as part of creating the graphical program in step 204. Configuring the graphical program to receive the one or more user interface events may comprise configuring the graphical program to receive notification when the one or more user interface events are generated during execution of the graphical program. Thus, the graphical program may receive information specifying occurrences of the one or more user interface events during execution of the graphical program.

As described above, a user interface event may be generated in response to a user interacting with a particular user interface element. Thus, the graphical program may receive information identifying a source or user interface element with which an event is associated. For example, the event information may specify a particular user interface element of the graphical user interface and an action performed on that element. In various embodiments, the user may be able to configure the graphical program to receive and respond to any of various types of user interface events, as well as other types of programmatic events. The available events to choose from may depend on a set of events supported by a particular graphical programming development environment. Exemplary user interface events are discussed below.

In one embodiment, configuring the graphical program to receive and respond to the one or more user interface events may comprise configuring the block diagram of the graphical program to receive and respond to the one or more user interface events. For example, for each event, a portion of graphical source code (such as a plurality of interconnected nodes) may be included in the block diagram, wherein the portion of graphical source code is operable to receive and respond to the respective user interface event. The portion of graphical source code may be executable to perform a desired process or action in response to the respective event. Thus, responding to a user interface event may comprise executing a portion of graphical source code that has been associated with that event.

A portion of graphical source code may be associated with an event in any of various ways and may be related to other nodes in the block diagram in any of various ways. In one embodiment, a sub-program node may be associated with an event. A sub-program node may comprise a node that is included in the block diagram, wherein the node specifies or represents a separate block diagram. Thus, graphical source code to respond to the various events may be encapsulated "within" or "behind" respective sub-program nodes, e.g., in a hierarchical fashion. In another embodiment, an event structure node may be included in the block diagram, wherein the event structure node includes one or more sub-diagrams, each sub-diagram including graphical source code for responding to one or more events. As used herein, a "sub-diagram" refers to a bounded area within the block diagram, in which graphical source code may be placed. In one embodiment, only one sub-diagram of the event structure node may be visible at a time, and the user may toggle through the various sub-diagrams as desired. In another embodiment, multiple sub-diagrams may be visible simultaneously. One embodiment of an event structure node is discussed in detail below.

In one embodiment, the user may specify the desired events that the graphical program should receive and respond to by interacting with a graphical user interface dialog or wizard. For example, the dialog may display a list of user interface elements and event actions associated with those elements, allowing the user to select the elements and actions of interest. In response to the user's selections, a graphical source code "placeholder" portion may be automatically included in the block diagram and associated with each selected event, e.g., a sub-program node or a sub-diagram of an event structure node may be created for and associated with each selected event. The user may then specify graphical source code for the placeholder portions, e.g., by including a plurality of interconnected nodes in each sub-program or sub-diagram, such that the graphical source code is operable to respond to the respective event in the desired manner. In some cases, the user may want the same portion of graphical source code to respond to multiple events. Thus, the dialog may enable the user to group events together as desired. For example, a single sub-diagram of an event structure node may be associated with two or more events.

When using a dialog such as described above, the specified events may be registered such that upon execution startup, the graphical program begins receiving and responding to the specified events. However, in some cases it may be desirable to dynamically register an event during execution of the graphical program. For example, for a given event, it may only be necessary or desirable to receive and respond to the event if some condition becomes true during the course of executing the program. Thus, the event may be dynamically registered when the condition becomes true or at some pre-determined point in the program. In one embodiment, an event registration node may be included in the block diagram and may be configured to register an event. The event registration node may be executable to dynamically register the event such that, after registering the event, the graphical program is operable to receive and respond to the event.

Similarly, it may also be desirable to un-register an event at some point during execution of the graphical program. The event to be un-registered may be an event that was specified at edit time via a dialog as described above or may be an event that was previously registered dynamically. In one embodiment, an event un-registration node may be included in the block diagram and may be configured to un-register an event. The event un-registration node may be executable to dynamically un-register the event such that, after un-registering the event, the graphical program does not receive and respond to the event.

In step 208, the graphical program may be executed. The graphical program may be executed on any kind of computer system(s) or reconfigurable hardware, as described above. In step 210, a user interface event may be generated during execution of the program, e.g., in response to a user interacting with the graphical user interface. As shown, if the user interface event is an event to which the graphical program is configured to respond, then in step 212, the graphical program may receive and respond to the generated user interface event. As described above, responding to the event may comprise executing a portion of graphical source code associated with the event.

If the graphical program is not configured to receive and respond to the generated event, then the event may have no effect on the execution of the graphical program. As indicated by the loop in the flowchart, multiple events may be generated, received, and responded to during execution of the graphical program.

The functionality of receiving the generated events and invoking the corresponding portions of graphical source code may be implemented in any way, e.g., depending on the particular graphical programming development environment used to create the graphical program. For example, in one embodiment, the graphical program may execute under the management of an execution subsystem of the graphical programming development environment, and the execution subsystem may intercept events as they are generated and may invoke the appropriate portions of the graphical program for registered events. In one embodiment, a mapping may be performed between events generated by the computer system's native user interface system and events defined or supported by the graphical programming development environment.

In another embodiment, the graphical program may not execute under an execution subsystem of the graphical programming development environment, but may execute independently. In this case, for example, when executable code for the graphical program is created, code operable to intercept the events may be linked in with the graphical program.

In one embodiment, in addition to the graphical program responding to an event, the event may be further processed. For example, depending on the type of event, the user interface system or operating system may process the event. However, in some cases, the graphical program may filter the event, e.g., by changing event data for the event. This may affect later processing of the event. For example, the graphical program may filter keystrokes by changing lowercase keystroke event data to uppercase event data. Also, in some cases, the graphical program may discard an event altogether.

Although the method is described above in terms of user interface events, the method may also be used to create a graphical program operable to receive and respond to any other type of programmatic event.

Figure 5:
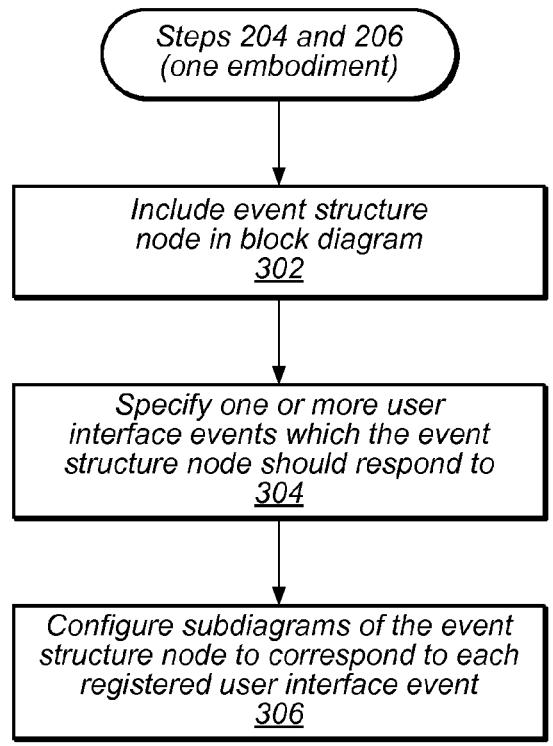
FIG. 5 is a flowchart diagram illustrating one embodiment of using an event structure node to configure a graphical program to receive and respond to events.

FIG. 5—Utilizing an Event Structure Node

FIG. 5 is a flowchart diagram illustrating one embodiment of steps 204 and 206, in which an event structure node is utilized to receive and respond to events. In step 302, an event structure node may be included in the block diagram of the graphical program in response to user input. For example, the user may drag and drop the event structure node into the block diagram from a palette, may select the event structure node using a menu command, or may cause the event structure node to be included in the block diagram in any of various other ways.

In step 304, one or more user interface events or other type of events that the event structure node should respond to may be specified. As described above, the events may be specified using a graphical user interface dialog and/or by connecting one or more event registration nodes to the event structure node.

The event structure node may be configured to have one or more sub-diagrams, wherein each sub-diagram corresponds to one or more events. In step 306, each of these sub-diagrams may be configured. For each sub-diagram, the user may include a portion of graphical source code in the sub-diagram, such that the portion of graphical source code is executable to respond to the respective event(s) as desired.

The following describes one particular embodiment of an event structure node and how such an event structure node may be used in a block diagram. It is noted that the following description includes details for exemplary purposes only and are not intended to limit the scope of the methods described above.

Figure 6:
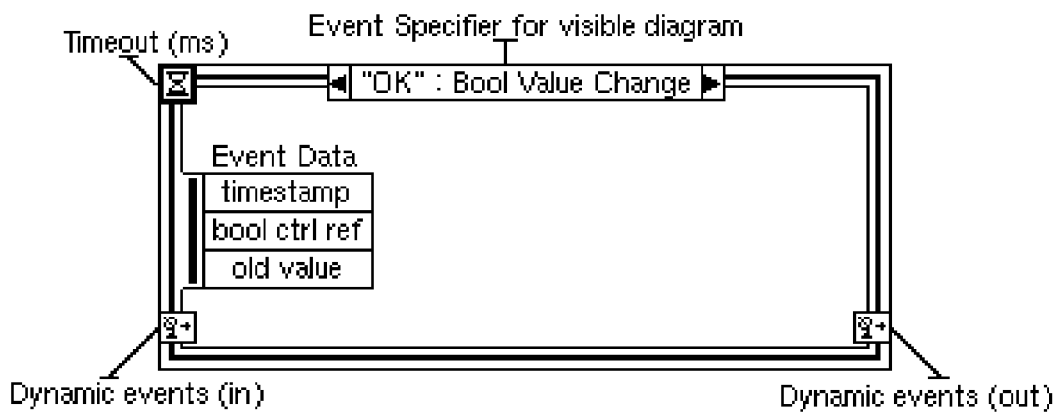
FIG. 6 illustrates an exemplary event structure node available for inclusion in the block diagram of a graphical program.

FIG. 6 illustrates an exemplary event structure node available for inclusion in the block diagram of a graphical program. The event structure node may comprise multiple sub-diagrams, each associated with one or more registered events. On each sub-diagram, the user may include or insert a portion of graphical source code (e.g., a set of interconnected nodes) operable to respond to the respect event(s) to which the sub-diagram corresponds. In one embodiment, only one sub-diagram of the event structure node is visible at a time. When editing or viewing the block diagram, the user may change the displayed sub-diagram using the arrows shown at the top of the event structure node.

When a registered event occurs, the event structure node may execute the appropriate sub-diagram for the event that occurred. This sub-diagram may have access to data for that event via terminals on the left hand side of the interior of the event structure node. Each sub-diagram may have different event data, depending on which event(s) are handled by that sub-diagram.

Figure 7:
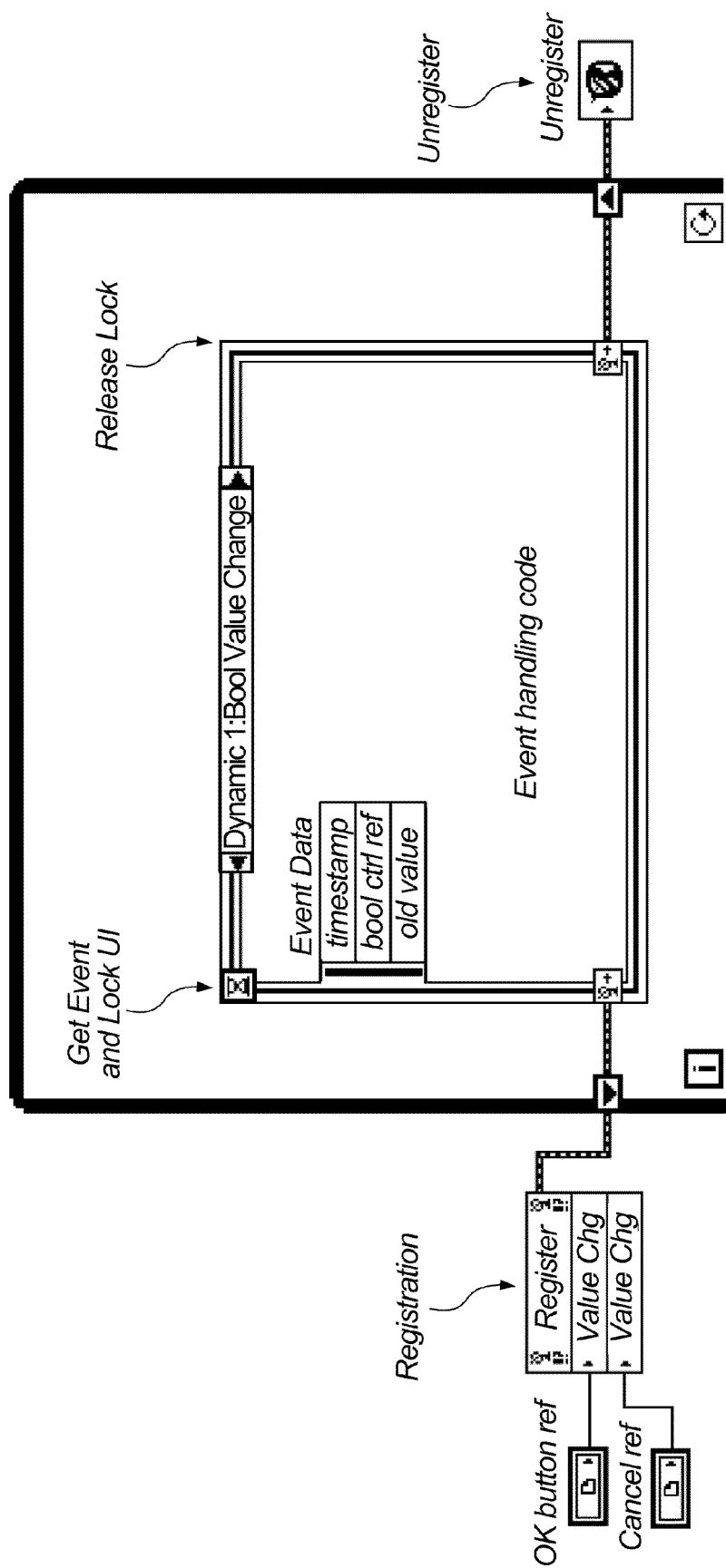
FIG. 7 illustrates an exemplary block diagram that uses the event structure node of FIG. 6.
Figure 8:
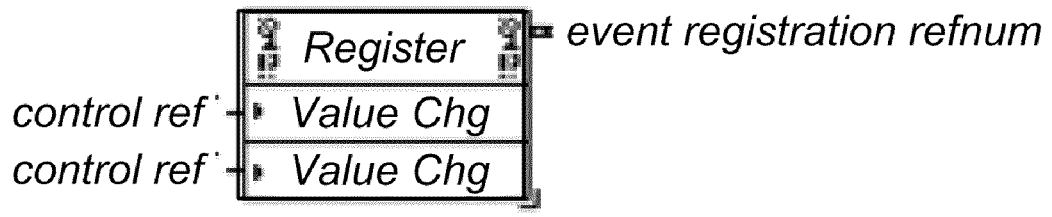
FIG. 8 illustrates an exemplary event registration node.

FIG. 7 illustrates an exemplary block diagram that uses the event structure node. The block diagram of FIG. 7 also illustrates an event registration node (see FIG. 8) operable to dynamically register two events. In this case, a "value change" event is being registered for an OK button and a cancel button, respectively. Thus, when registering an event, a combination of a source, such as a particular user interface element (e.g., a window or control), and a specific action, condition, or event type associated with that element (e.g., window resize, control value change, etc.) may be specified.

The event registration node may be a growable node (i.e., with a variable number of inputs) that accepts input references to one or more user interface elements. Each user interface element input reference may have a "Select Event" pop-up context menu to select which event or action to register for that element. Multiple events or actions can be registered for the same user interface elements, or for multiple user interface elements, using only one event registration node. The output of the event registration node may be a composite "registered event" reference that gives a unique ID to the registration. This ID may be used internally to keep track of who needs to be notified of an event when it occurs. The registered event reference can be wired to the 'dynamic events' input of the event structure node, to an event un-registration node, or to the input of another event registration node.

In FIG. 7, the event structure node is enclosed in a loop structure. The following may be repeatedly performed in the loop (the event structure node integrates the functionality of these steps):

Get Event/Lock User Interface: Sleep, waiting for a registered event and receive information describing an event when one is generated. Non-registered events may be handled automatically, with no effect on the program. In one embodiment, when a registered event is generated, the user interface processing may be locked and low-level event processing may be blocked until the event is handled and the lock released. Raw user interface events may be only minimally processed and then queued until the lock is released. Locking the user interface processing may be necessary for a multi-threaded dataflow program. If the graphical program is not multi-threaded, this locking behavior may not be necessary.

Respond to Event: Execute the graphical source code corresponding to the event.

Figure 9:
FIG. 9 illustrates an exemplary "Unlock UI" node.

Release Lock: Release the user interface lock and resume processing low level and non-registered events. Thus, after the sub-diagram associated with an event executes, the user interface processing may be unlocked and queued events may be processed as normal until another registered event occurs. An optional "Unlock UI" node (see FIG. 9) can be placed on an event handling sub-diagram to release the lock early before the sub-diagram completes. Also, each sub-diagram may be individually configured to lock or not lock user interface processing by default. This may be configured, for example, using a popup context menu.

Figure 10:
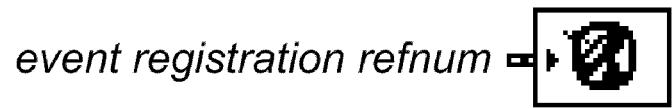
FIG. 10 illustrates an exemplary event un-registration node.

FIG. 7 also illustrates an event un-registration node (see FIG. 10) operable to dynamically un-register one or more events. Any events pending in the associated event queue may be discarded. After an event is un-registered, default event-handling for that event may be resumed by the user interface.

The block diagram of FIG. 7 utilizes an event registration node to dynamically register events. However, events may also be statically registered using a dialog. An exemplary dialog for this purpose is described below.

The event structure node shown in FIG. 6 has several special terminals on its border:

timeout (ms): The number of milliseconds to sleep waiting on an event to occur. An input of −1 (the default) means to wait forever. If the timeout expires before an event occurs, a "Timeout" event may be generated.

dynamic events: A pair of matching terminals on the left and right borders of the event structure node. The left-hand input terminal may accept either an event registration reference, or a user interface element reference, or a cluster of these. The right-hand terminal is in place to the left-hand one, and does not need to be wired from the inside of the diagram.

event data node: A special node attached to the inside left border of each event handling sub-diagram. The data provided by this node may be different on each sub-diagram, depending on which event(s) that sub-diagram is configured to handle. In one embodiment, if a single sub-diagram is configured to handle multiple events, only the data which is common to all handled event types may be available. However, some event data may be considered "crucial," and the user may not be allowed to configure a sub-diagram to handle multiple events that are incompatible because crucial data would be omitted. Common event data may include: a reference to the source or user interface element with which the event is associated, a time stamp indicating when the event occurred, etc.

The sub-diagram for some events may filter the events. For example, the handler sub-diagram for an event may modify the event data before the event is further processed by the user interface, or may discard the event entirely. In one embodiment, this may be accomplished by including an additional "event data feedback" node in the event-handling sub-diagram. This node can be used to replace the event data with new data. Also, a "discard event" Boolean field may be available which will cause the event to be discarded entirely if true. Filtering events in this way may allow more freedom in controlling how the user interface behaves. For example, the graphical program could respond to a "window close" event by bringing up a confirmation dialog, discarding the event if the user does not confirm the action. As another example, the graphical program could respond to a "key press" event by changing the key data to an uppercase letter, thus forcing all characters typed into a string control to be uppercase, or the graphical program could filter out unwanted characters.

Figure 11:
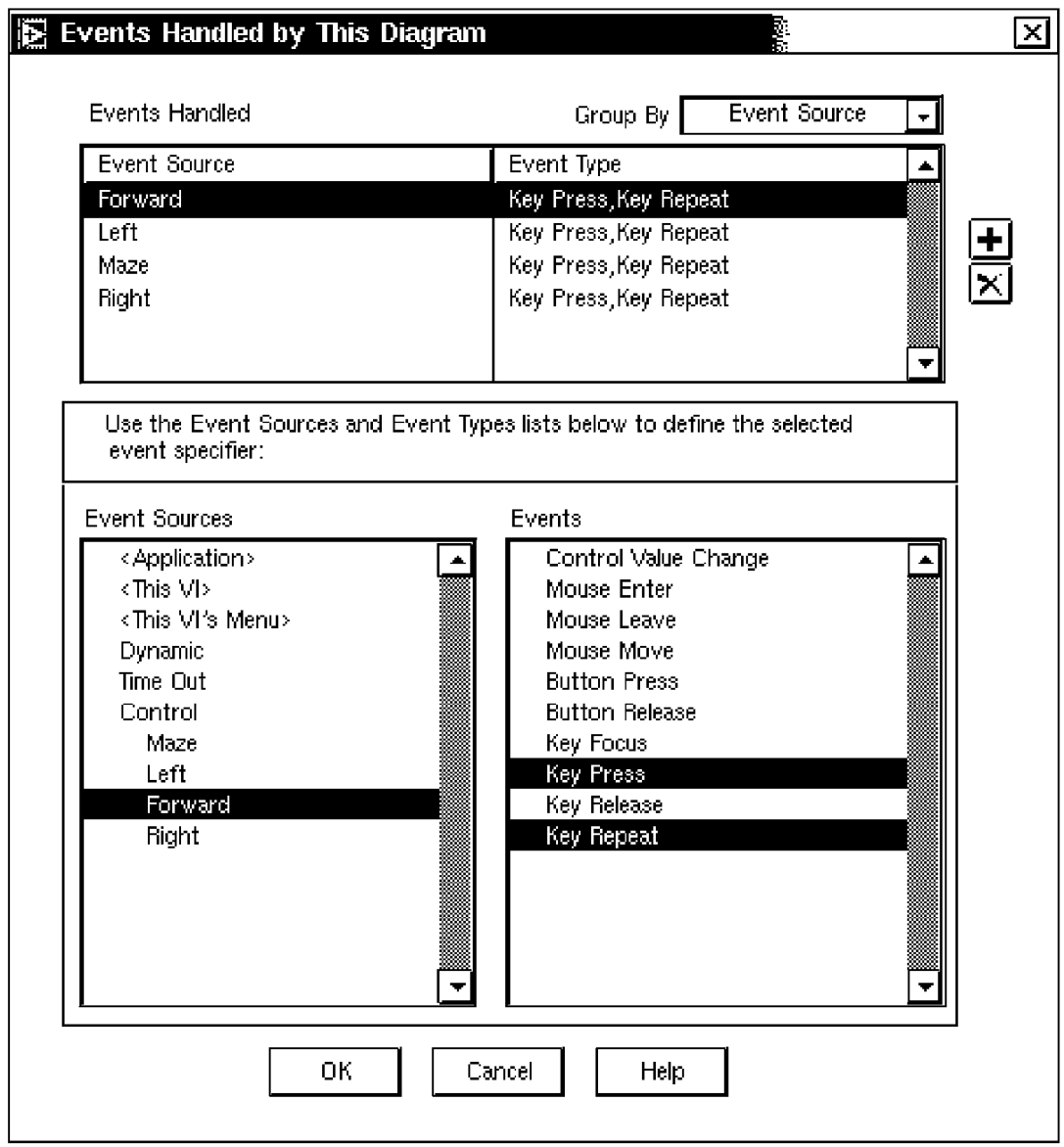
FIG. 11 illustrates an exemplary event configuration dialog.

FIG. 11 illustrates an exemplary event configuration dialog. The particular set of events handled by a particular event structure node sub-diagram may be configured using this event configuration dialog. For example, the dialog may be accessed using a pop-up menu item from the sub-diagram. (A similar dialog may be used to configure an event registration node.)

The top pane, "Events Handled", lists <event source, event type> pairs handled by this sub-diagram. When editing complex sets of events, the "Group By" ring allows the user to group events together in the list by event source, event type, or ungrouped. If the user groups by event source, each event source (for example, each individual user interface element) appears on a row by itself, with all corresponding event types separated by commas, as shown. Grouping by event type does the converse—each event type is on a separate row, with the corresponding sources separated by commas. Selecting "Ungrouped" causes each pair to be listed on a row by itself. This grouping is merely a way of controlling the way the information is viewed. The set of events being handled does not change, but it is easier to verify that the intended set of events is being handled. Clicking on the "+" and "X" buttons adds or deletes a row from the top Events Handled pane.

When the user clicks on a row in the "Events Handled" listbox pane, the twin "Event Sources" and "Events" panes below update to highlight the selected items. Selecting or deselecting items in these panes causes the top "Events Handled" pane to update accordingly. In addition to each user interface control on the front panel, the event sources that can be selected include special sources such as <This Application>, <This VI>, <This VI's Menu>, a Time Out event source, and a Dynamic event source.

The Dynamic event source refers to events specified via the "dynamic refnum" input to the event structure node. The Dynamic source can be collapsed and expanded in the manner of a tree control to show individual dynamically registered controls/events. If an event registration reference is wired, the names listed may be derived from the individual events registered upstream in an event registration node. If a cluster of references is wired, the cluster field names will serve the same purpose. These dynamic sub-field names can be selected individually and associated with different event handling sub-diagrams. When using the dialog to configure an event registration node, all events are dynamic. In this case, the object references wired to the node are listed as sources.

Selecting a new event source in the left pane will cause the right pane to update to list the events or actions available from that source. If multiple sources are selected (in group by event type mode), the events list is culled to show only events which exist for all selected sources.

The Help button at the bottom brings up context-sensitive help for the dialog, which describes the purpose of each pane and details about the currently selected event source and type. The dialog may prevent the user from grouping together multiple event sources/types if the events are incompatible, that is, would yield no useful common event data. Likewise, it may be illegal to group "filter events" which do not have identical feedback data.

An alternative presentation of this dialog would be to use a tree control, with event sources as branches and event types as leaves.

In one embodiment, events may be configured from the context of the front panel or graphical user interface of the graphical program. For example, there may be an edit-time pop-up item available on each front panel user interface control to edit the events of interest for that control. A dialog may come up containing a simple multi-selection listbox of the events associated with that control (like the lower-right pane of the general dialog described above). Adding new events to the list may automatically populate the event structure with empty sub-diagrams, one per event. Removing events may delete the events from the event structure and the associated sub-diagram, if it is the only event handled by that sub-diagram, after asking user confirmation.

In one embodiment, the same event can be registered multiple times. For example, there may be multiple event structure nodes, each having a sub-diagram corresponding to the event. When the event is generated, each of these sub-diagrams may be executed.

User-Defined Events

In one embodiment, the event structure node may handle user-defined events. For example, the graphical programming development environment may provide one or more nodes operable to create a user-defined event or event set. A reference to a user-defined event may then be wired to an event registration node or directly to an event structure node. A user-defined event may be generated, for example, by executing a "Send Event" node, specifying the event to be dynamically generated. The appropriate sub-diagram of the event structure node may then be executed in response to the user-defined event.

Exemplary Events and Uses of Events

A graphical program may make use of user interface events in many different ways. The following list illustrates some exemplary uses:
   to monitor button presses
   to filter numeric input (e.g., so that only even numbers may be input)
   to filter string input (e.g., to convert all characters to upper case)
   to be notified of a the graphical program terminating in order to do some cleanup, put hardware in a known state, etc.
   to disallow closing a window by clicking the close button
   to handle resizing of fonts, placement/size of controls when window is resized
   to make the graphical program sleep (or do less processing) when window is minimized
   to construct one's own hot-keys (with keypress events)
   to set up one's own help-window for specialized controls (with mouse focus events)
   to implement an image map using a cosmetic or other image The following represents a partial list of possible user interface event types. as well as data that the graphical program may receive when the respective events occur:
   Value Changed: Control Reference, Time Stamp, Event Type, Previous Value, New Value
   Panel Closing: Panel Reference, Time Stamp, Event Type
   Panel Closed: Panel Reference, Time Stamp, Event Type
   Application Exiting: Application Reference, Time Stamp, Event Type
   Mouse Click: Control Reference, Time Stamp, Mouse Local Coordinates, Button Pressed, Modifiers
   Key Press: Control Reference, Time Stamp, Key, Modifiers
   Mouse Up: VI Reference, Time Stamp, Button Released
   Mouse Down: VI Reference, Time Stamp, Button Pressed
   Key Up: VI Reference, Time Stamp, Key Released
   Key Down: VI Reference, Time Stamp, Key Pressed Many other events may be supported, such as Mouse Focus (Mouse Enter/Leave), Key Focus(Gained/Lost), Execution Terminating, Panel Resized, etc. In addition, some events may be supported that are particular to a certain type of user interface element or control. The following is a partial list of possible user interface events related to user interface controls provided by the LabVIEW graphical programming development environment:
   Cursor
      Plot changed
      Position Changed
      Point Index Changed Scale
   Range Changed (minimum/maximum)
   Marker Spacing Changed
   Fit Changed
Color Box
   Value Change
   Color Area Size Change (width/height)
Boolean
   Value Change
Path
   Value Change
   Browse Dialog Open
List Box
   Row Number at top Changed
   Item Double-clicked
   Value Change
   Selection Added
   Selection Removed
Table
   Value Change
   Selection Change
   Top Left corner row/col Change
   Active Cell Change
Array
   Selection Change
   Value Change
   Top Left corner row/col Change
Picture
   Mouse Click
   Mouse Move
   Key Pressed/Down
Numeric
   Increment
   Decrement
   Value Change
   Initialized
Gauge
   Interpolation Changed
   Markers Changed
Knob
   Markers/Scale Changed
   Value Change
Numeric With Scale
   Active Thumb Changed
   Scale Info Changed
GraphChart
   Active X Scale Change
   Active Y Scale Change
   Plot Area Size Change
Waveform Chart
   Active Plot Change
   Update Mode Change
   Chart Cleared
   Plot Legend Visible
   Digital Display Visible
   Scrollbar Visible
   Xscale/Yscale visible
   Autoscale X
   Autoscale Y
Waveform Graph
   Active Plot Change
   Active Cursor Change
   Autoscale X
   Autoscale Y
   Smooth Update
   Graph Legend Visible
   Graph Palette visible
   Xscale/Yscale visible
Intensity Chart
   Scrollbar Visible
   Xscale/Yscale/Zscale visible
   Graph Palette Visible
   Chart Cleared
   Update Mode Changed
   Autoscale X/Y/Z changed
Intensity Graph
   Graph palette Visible
   Xscale/Yscale/Zscale visible
   Graph Cleared
   Autoscale X/Y/Z changed
   Smooth Update Enabled/Disabled
String
   Value Change FIGS. 12-14: Exemplary LabVIEW Graphical Program FIGS. 12-14 illustrate an exemplary LabVIEW graphical program that uses one embodiment of an event structure node.

Figure 12:
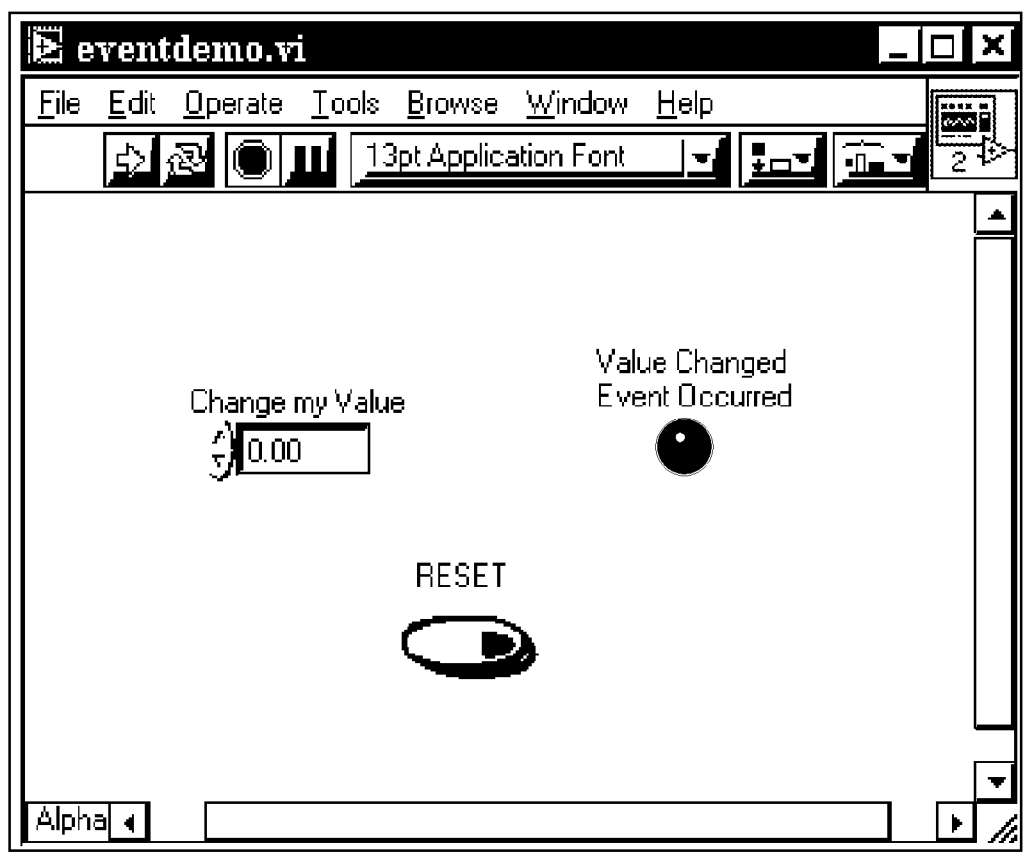
FIGS. 12-14 illustrate an exemplary LabVIEW graphical program that uses one embodiment of an event structure node.

FIG. 12 illustrates the graphical user interface for the program. The graphical user interface includes a numeric control labeled "Change my Value" and a button control labeled "RESET". The graphical user interface also includes an LED indicator labeled "Value Change Event Occurred". When the user operates the numeric control to change its value, the graphical program receives a "value changed" event and responds by causing the LED indicator to light up. When the user clicks the button, the graphical program receives a "mouse click" event and responds by causing the LED to turn off.

Figure 13:
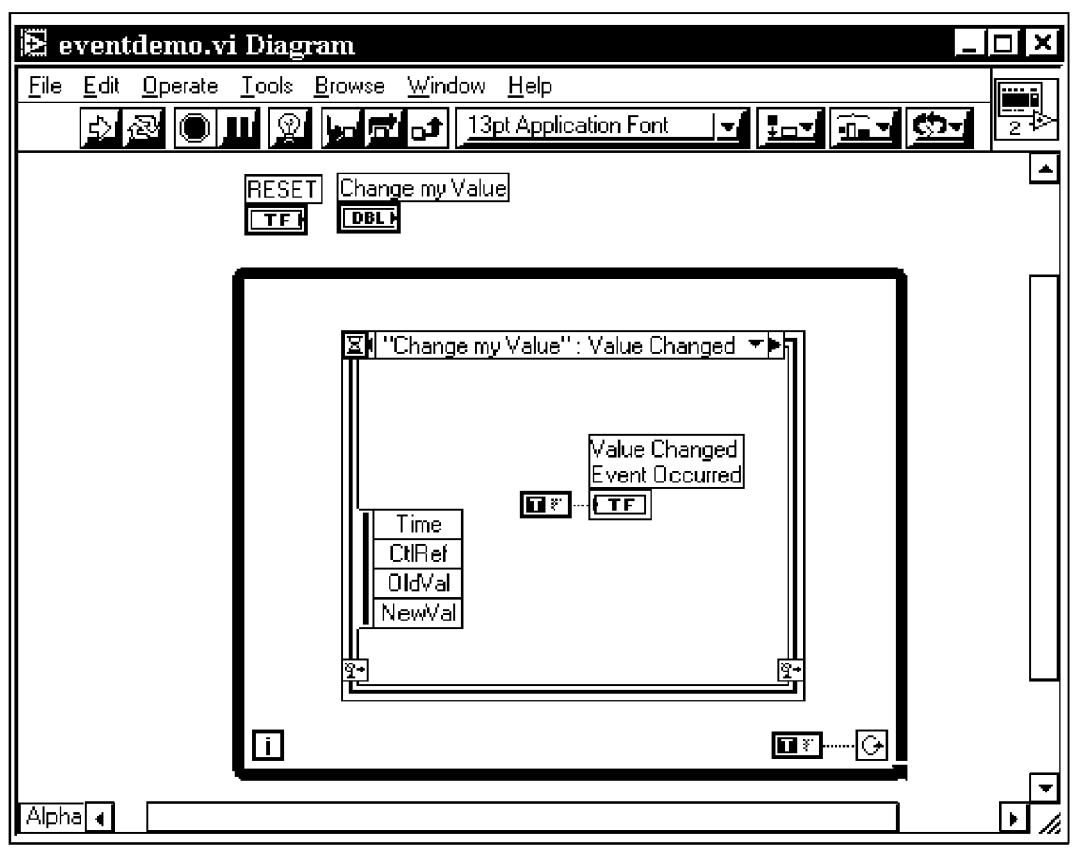

FIG. 13 illustrates the block diagram of the LabVIEW graphical program. As shown, the block diagram includes an event structure node. In this example, the event structure node has two sub-diagrams, one for responding to the "value changed" event for the numeric control, and one for responding to the "mouse click" event for the button. In the FIG. 13 view of the block diagram, the sub-diagram for the "value changed" event is shown. In this case, the graphical source code shown in the sub-diagram simply causes the LED indicator to light up.

Figure 14:
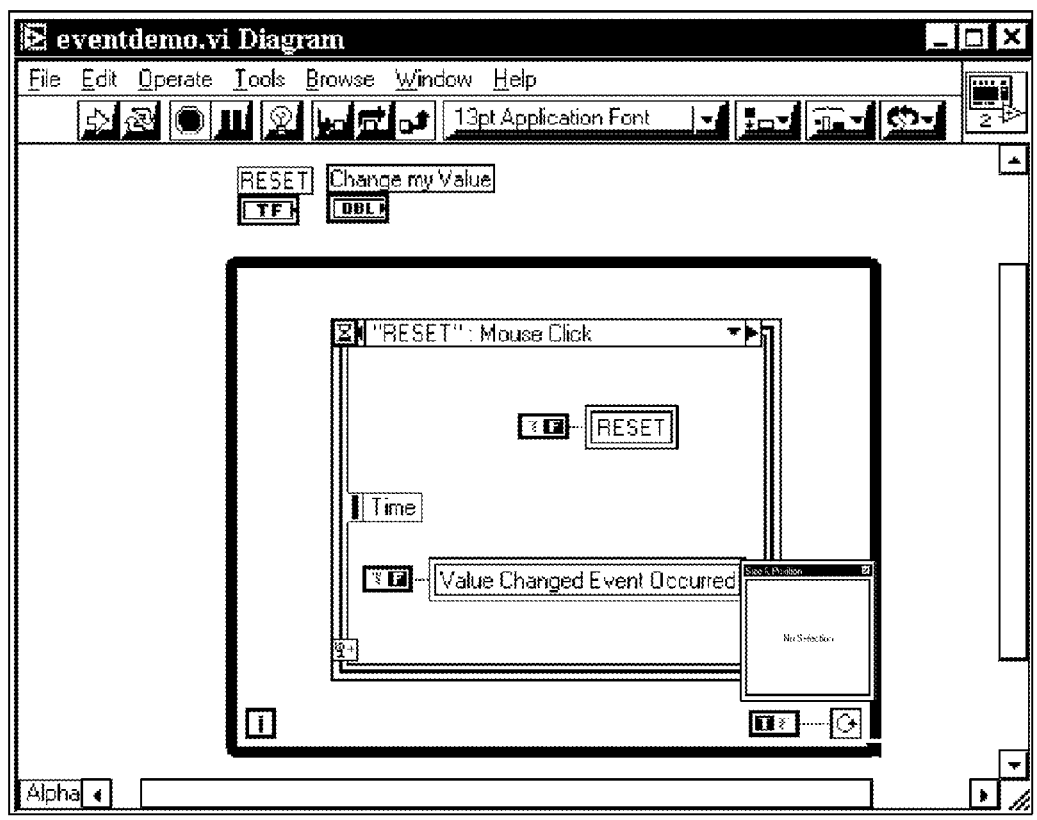

FIG. 14 is another view of the block diagram, in which the sub-diagram for the "mouse click" event is shown. In this case, the graphical source code shown in the sub-diagram simply causes the LED indicator to turn off.

FIGS. 12-14 are of course a very simple example for illustrative purposes, and user interface events may be used for more complex purposes. For example, the ability to receive user interface events may advantageously enable the graphical program to determine, for example, how the numeric control value was changed. For example, by configuring the program to respond to a "toggle arrow clicked" event for the numeric control instead of a "value changed" event, the program could cause the LED indicator to light up only when the numeric control value was changed by the user operating the control's toggle arrow and may ignore value changes caused by other operations, such as the user directly typing a new value into the control. This type of flexibility and level of detailed information regarding actions external to the graphical program would not be possible without the ability to receive and respond to user interface events.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method comprising:
   displaying a block diagram of a graphical program on a display of a computer system, wherein the block diagram includes at least a first plurality of interconnected nodes visually indicating functionality of the graphical program, wherein the first plurality of interconnected nodes includes a first node;
   associating a first event and a second plurality of interconnected nodes with the first node in response to user input, wherein said associating configures the first node to invoke execution of the second plurality of interconnected nodes in response to the first event being generated during execution of the graphical program, wherein the second plurality of interconnected nodes visually indicates functionality for responding to the first event; and
   executing the graphical program on the computer system, wherein executing the graphical program comprises:
      the first node receiving a notification that the first event was generated; and
      the first node invoking execution of the second plurality of interconnected nodes in response to the notification, wherein the second plurality of interconnected nodes executes to perform the functionality for responding to the first event.

2. The computer-implemented method of claim 1,
   wherein the first event is associated with the first node in response to user input specifying a name of the first event.

3. The computer-implemented method of claim 2, further comprising:
   displaying names of a plurality of events, wherein the names of the plurality of events include the name of the first event;
   wherein the user input specifying the name of the first event comprises user input selecting the name of the first event from the displayed names.

4. The computer-implemented method of claim 1,
   wherein said associating the first event and the second plurality of interconnected nodes with the first node in response to user input comprises associating the first event and the second plurality of interconnected nodes with the first node in response to user input received during creation of the graphical program and before execution of the graphical program.

5. The computer-implemented method of claim 1, further comprising:
   displaying the second plurality of interconnected nodes together in the block diagram with the first plurality of interconnected nodes.

6. The computer-implemented method of claim 5,
   wherein the first node includes an interior portion;
   wherein displaying the second plurality of interconnected nodes in the block diagram comprises displaying the second plurality of interconnected nodes within the interior portion of the first node.

7. The computer-implemented method of claim 1,
   wherein the block diagram including the first plurality of interconnected nodes is a first block diagram;
   wherein the method further comprises displaying the second plurality of interconnected nodes in a second block diagram separate from the first block diagram.

8. The computer-implemented method of claim 1,
   wherein the first event is a first user interface event.

9. The computer-implemented method of claim 8,
   wherein the first user interface event specifies one or more of:
      a user interface element of a graphical user interface of the graphical program;
      an action performed on a user interface element of a graphical user interface of the graphical program.

10. The computer-implemented method of claim 1,
    wherein the first event is one or more of:
       a system event;
       a timer event;
       an event generated in response to data acquired from a device.

11. The computer-implemented method of claim 1, further comprising:
    including each respective node of the first plurality of interconnected nodes in the block diagram in response to user input selecting the respective node; and
    interconnecting the nodes of the first plurality of interconnected nodes in response to user input specifying connections.

12. A computer-readable memory medium storing program instructions,
    wherein the program instructions are executable to perform the following prior to execution of a graphical program:
       display a block diagram of the graphical program, wherein the block diagram includes at least a first plurality of interconnected nodes visually indicating functionality of the graphical program, wherein the first plurality of interconnected nodes includes a first node;
       receive user input specifying a first user interface event;
       receive user input specifying a second plurality of interconnected nodes, wherein the second plurality of interconnected nodes visually indicates functionality for responding to the first user interface event;
       configure the first node to invoke execution of the second plurality of interconnected nodes in response to the first user interface event being generated during execution of the graphical program;
    wherein the program instructions are further executable to perform the following during execution of the graphical program:
       notify the first node that the first user interface event was generated, wherein the first node is configured to invoke execution of the second plurality of interconnected nodes in response to the notification, wherein the second plurality of interconnected nodes is executable to perform the functionality for responding to the first user interface event.

13. The computer-readable memory medium of claim 12,
    wherein the user input specifying the first user interface event comprises user input specifying a name of the first event.

14. The computer-readable memory medium of claim 13,
    wherein the program instructions are further executable to:
       display names of a plurality of events, wherein the names of the plurality of events include the name of the first event;
       wherein the user input specifying the name of the first event comprises user input selecting the name of the first event from the displayed names.

15. The computer-readable memory medium of claim 12,
    wherein the program instructions are further executable to:
       display the second plurality of interconnected nodes together in the block diagram with the first plurality of interconnected nodes.

16. The computer-readable memory medium of claim 15, wherein the first node includes an interior portion;
wherein the program instructions are executable to display the second plurality of interconnected nodes within the interior portion of the first node.

17. The computer-readable memory medium of claim 12, wherein the block diagram including the first plurality of interconnected nodes is a first block diagram;
wherein the program instructions are further executable to display the second plurality of interconnected nodes in a second block diagram separate from the first block diagram.

18. The computer-readable memory medium of claim 12, wherein the first event is a first user interface event.

19. The computer-readable memory medium of claim 12, wherein the first event is one or more of:
    a system event;
    a timer event;
    an event generated in response to data acquired from a device.

20. A system comprising:
one or more processors; and
memory storing program instructions;
wherein the program instructions are executable by the one or more processors to perform the following prior to execution of a graphical program:
    display a block diagram of the graphical program, wherein the block diagram includes at least a first plurality of interconnected nodes visually indicating functionality of the graphical program, wherein the first plurality of interconnected nodes includes a first node;
    receive user input specifying a first user interface event;
    receive user input specifying a second plurality of interconnected nodes, wherein the second plurality of interconnected nodes visually indicates functionality for responding to the first user interface event;
    configure the first node to invoke execution of the second plurality of interconnected nodes in response to the first user interface event being generated during execution of the graphical program;
wherein the program instructions are further executable by the one or more processors to perform the following during execution of the graphical program:
    notify the first node that the first user interface event was generated, wherein the first node is configured to invoke execution of the second plurality of interconnected nodes in response to the notification, wherein the second plurality of interconnected nodes is executable to perform the functionality for responding to the first user interface event.

* * * * *